US010001662B2

(12) United States Patent
Gottlieb

(10) Patent No.: US 10,001,662 B2
(45) Date of Patent: Jun. 19, 2018

(54) METHOD AND DEVICE FOR TREATING AVERTED GAZE

(71) Applicant: Daniel D. Gottlieb, Atlanta, GA (US)

(72) Inventor: Daniel D. Gottlieb, Atlanta, GA (US)

( * ) Notice: Subject to any disclaimer, the term of this patent is extended or adjusted under 35 U.S.C. 154(b) by 302 days.

(21) Appl. No.: 14/658,076

(22) Filed: Mar. 13, 2015

(65) Prior Publication Data

US 2015/0261012 A1   Sep. 17, 2015

Related U.S. Application Data

(60) Provisional application No. 61/953,717, filed on Mar. 14, 2014.

(51) Int. Cl.
*G02C 7/14* (2006.01)

(52) U.S. Cl.
CPC .......... *G02C 7/14* (2013.01); *G02C 2202/10* (2013.01)

(58) Field of Classification Search
None
See application file for complete search history.

(56) References Cited

U.S. PATENT DOCUMENTS

| 3,883,225 | A | * | 5/1975 | Rehm | A61B 3/04 |
| | | | | | 351/158 |
| 3,904,281 | A | * | 9/1975 | Jampolsky | G02B 3/08 |
| | | | | | 351/159.09 |
| 4,744,633 | A | * | 5/1988 | Sheiman | G02B 27/26 |
| | | | | | 351/201 |
| 5,268,710 | A | * | 12/1993 | Anstey | A61F 9/026 |
| | | | | | 351/121 |
| 7,789,508 | B2 | * | 9/2010 | Padula | G02C 7/14 |
| | | | | | 351/159.58 |
| 8,992,010 | B2 | * | 3/2015 | Ho | G02C 7/04 |
| | | | | | 351/159.12 |
| 2009/0237611 | A1 | * | 9/2009 | Walsh | G02C 7/14 |
| | | | | | 351/158 |
| 2011/0032477 | A1 | * | 2/2011 | Ohanesian | G02C 7/081 |
| | | | | | 351/159.58 |
| 2015/0331260 | A1 | * | 11/2015 | Chen | G02C 7/14 |
| | | | | | 348/122 |

FOREIGN PATENT DOCUMENTS

CN    201654353 U  * 11/2010

OTHER PUBLICATIONS

Robert Fox, "A Rationale for the Use of Prisms in the Vision Therapy Room", Journal of Behavioral Optometry, Mar. 2011.*

* cited by examiner

*Primary Examiner* — Charlie Y Peng
(74) *Attorney, Agent, or Firm* — Russell L. Sandidge

(57) ABSTRACT

A method and apparatus for aiding the vision and motor function of an individual with autism and other complex developmental delays due to the inability to sustain convergence in addition to ocular motor deficiencies. The method allows improved direct midline gaze increasing selective attention with less averted gaze. The method is practiced by the steps of mounting one or more prisms with bases most often nasally of one or both lenses of a pair of glasses. An individual wearing these glasses even while sleeping will awaken to a more normalized and less confusing visual spatial world.

10 Claims, 2 Drawing Sheets

METHOD AND DEVICE FOR TREATING AVERTED GAZE

PRIORITY CLAIM

This application claims the benefit of U.S. Provisional Patent Application No. 61/953,717 filed by this same inventor on Mar. 14, 2014, the contents of which is hereby incorporated by reference.

TECHNICAL FIELD

The present invention relates generally to a method and apparatus for the treatment of the inability to maintain a direct and sustained visual gaze, and, more specifically, the present invention relates to the use of prescription glasses in which the lenses comprise prisms placed in an individual's direct line of sight for treating the averted gaze of autism and other disorders in which visual and perceptual impairment are symptomatic.

BACKGROUND OF THE INVENTION

Autism Spectrum Disorder (ASD) is a neural developmental disorder characterized by severe and pervasive impairment in thinking, feeling, language, and the ability to relate to others as well as physical stimming, repetitive or stereotypy behaviors. Autism effects information processing in the brain by altering how nerve cells and their synapses connect and organize; how this occurs is not well understood. The onset of ASD is generally before the age of 3 years, and is usually first diagnosed in early childhood. ASD can range from a severe form, called Autistic Disorder, through Pervasive development disorder not otherwise specified (PDD-NOS), to a much milder form, Asperger syndrome. ASD has a prevalence of 0.6% in the population, affecting many more boys than girls.

Currently there is no single best treatment for all children with ASD nor is there a simple diagnostic method for the disorder. One point that expert professionals agree on is that early intervention is important; another is that most individuals with ASD respond well to highly structured, specialized programs. As soon as a child's disability has been identified, it is recommended to start the intervention programs. Effective programs teach early communication and social interaction skills. In children younger than 3 years, appropriate interventions usually take place at home or at a child care center. These early intervention programs typically target specific deficits in learning, language, attention and movement. Included are behavioral, communication, occupational, and physical therapy methods along with social play interventions.

While there is no standard diagnosis method for ASD, researchers have recently determined that detecting unusual tracking eye movement in infants can be an indicator of the onset of ASD, see e.g., recent study conducted by the Marcus Autism Center, Children's Healthcare of Atlanta, and Emory University School of Medicine reported in the online version of Nature. Specifically, the inability of an infant to focus on specific objects, particularly the eyes of other individuals, may indicate visual perception issues consistent with ASD.

The averted gaze of autism interferes with every available therapy for the disorder, including occupational, physical, and speech therapies. Because a child does not have the verbal or cognitive abilities to identify the visual and perceptual confusion, the child is typically unaware of the visual spatial confusion and is unable to communicate this problem to adults. The gaze aversion creates an obstacle to every task and is pervasive. The emotional costs to the individual and family facing the insurmountable obstacle of visual confusion with visual and motor gaze aversion are immeasurable. A child with Autism frequently places hands out to the sides of the body helping to feel for a wall, chair, or the doorknob. The chance of falling and being injured is greater with visual confusion.

The inability of a young child to recognize his own visual perception issues is an obstacle to treating those issues. Further the averted gaze of autism is a hindrance to the known therapy methods, which are believed to be more effective when they are implemented as early as possible. Thus there is a need for a method and apparatus to treat the inability to maintain a direct and sustained visual gaze, for those with autism or other visual and perceptual disorders.

The present invention relates to the use of prisms in the lenses of eyeglasses to treat averted gaze in children. The use of prisms to treat a variety of visual disorders is already well-known. For example, U.S. Pat. Nos. 4,779,972 and 8,696,116, both issued to the present inventor and hereby incorporated within this disclosure by reference, disclose the use of one or more prisms within standard glasses frames to treat patients suffering from visual field loss. Until now, however, no one has utilized prisms as herein described to treat the averted gaze that is common in ASD and other visual and perceptual disorders.

SUMMARY OF THE INVENTION

Briefly described, in a preferred embodiment, the present invention overcomes the above-mentioned disadvantages and meets the recognized need for such a device by providing a method for treating averted gaze, visual inattention, visual spatial confusion, failure to visually connect and bond in infancy or childhood, including treating convergence insufficiency and ocular motor deficiencies with and without Attention Deficit Disorders of an individual.

In one embodiment of the invention, the method comprises providing a pair of glasses having a first prism in one lens of the glasses and having the individual wear the glasses. The prism may preferably be oriented base inward toward the nose of the individual, and placed within the individual's direct line of sight when viewing with a relaxed, straight ahead gaze.

In another embodiment of the invention, the power of the first prism may be within the range of about 0.12 to about 45 diopters, and in another embodiment the power may be within the range of about 3.0 to about 9.0 diopters.

In yet another embodiment, the glasses further comprise a second prism in the second lens of the glasses. The second prism may preferably be oriented base inward toward the nose of the individual, and placed within the individual's direct line of sight when viewing with a relaxed straight ahead gaze.

In a further refinement of the above embodiment the power of the second prism may be within the range of about 0.12 to about 45 diopters, and in another embodiment the power may be within the range of about 3.0 to about 9.0 diopters.

A preferred embodiment of the invention includes glasses frames that are designed for use by children, and may be worn 24 hours per day. Such frames may be constructed of a flexible material that is safe for extended wearing, and may further include an attachment strap comprised of an elastic material to assist in holding the glasses in place.

Another embodiment of the invention provides a method for treating averted gaze, visual inattention, visual spatial confusion, failure to visually connect and bond in infancy or childhood, including treating convergence insufficiency with and without attention deficit disorders of an individual. The method comprises diagnosing the individual with a convergence disorder, and then providing a pair of glasses for the individual to wear. The glasses may comprise a prism within each lens, the prisms preferably oriented base inward toward the nose of the individual and located so that the prisms are within the direct line of sight of the individual when viewing with a relaxed, straight ahead gaze. The power of the prisms may be within the range of about 3.0 to about 9.0 diopters. The frame of the glasses may be constructed of a flexible material that is safe for extended wearing, and may further include an attachment strap comprised of an elastic material to assist in holding the glasses in place. The method may further comprise determining whether the prism therapy is successfully treating the individual's visual disorder, and refining the prism prescription for the individual as may be necessary to improve the effectiveness of the treatment.

In one final embodiment, the invention provides a method for detecting whether the use of prisms within glasses lenses may be useful in treating a patient's averted gaze. A kit is provided that comprises a set of lenses containing prisms of varying powers. The patient is fitted with a first pair of lenses of one prism power and allowed to use the lenses for an extended period of time while the patient is observed to determine if the prism lenses are effective. The patient is then fitted with a second pair of lenses from the set and observed to determine whether the second pair is more effective. The patient is then fitted with each successive pair of lenses to determine which pair is more effective.

In one refinement of this final embodiment, the pairs of lenses in the set are within glasses frames, so that the patient is fitted with successive pairs of lenses just by changing frames. Such frames may be constructed of a flexible material that is safe for extended wearing, and may further include an attachment strap comprised of an elastic material to assist in holding the glasses in place. That frames may be different colors so that the user may easily tell which power prisms are in each frame.

These and other objects, features, and advantages of the invention will become more apparent to those ordinarily skilled in the art after reading the following Detailed Description and Claims in light of the accompanying Figures.

BRIEF DESCRIPTION OF THE DRAWINGS

Accordingly, the present invention will be understood best through consideration of, and reference to, the included Figures, viewed in conjunction with the Detailed Description of the Invention referring thereto, in which like reference numbers throughout the various Figures designate like structure and in which.

Figure 1:
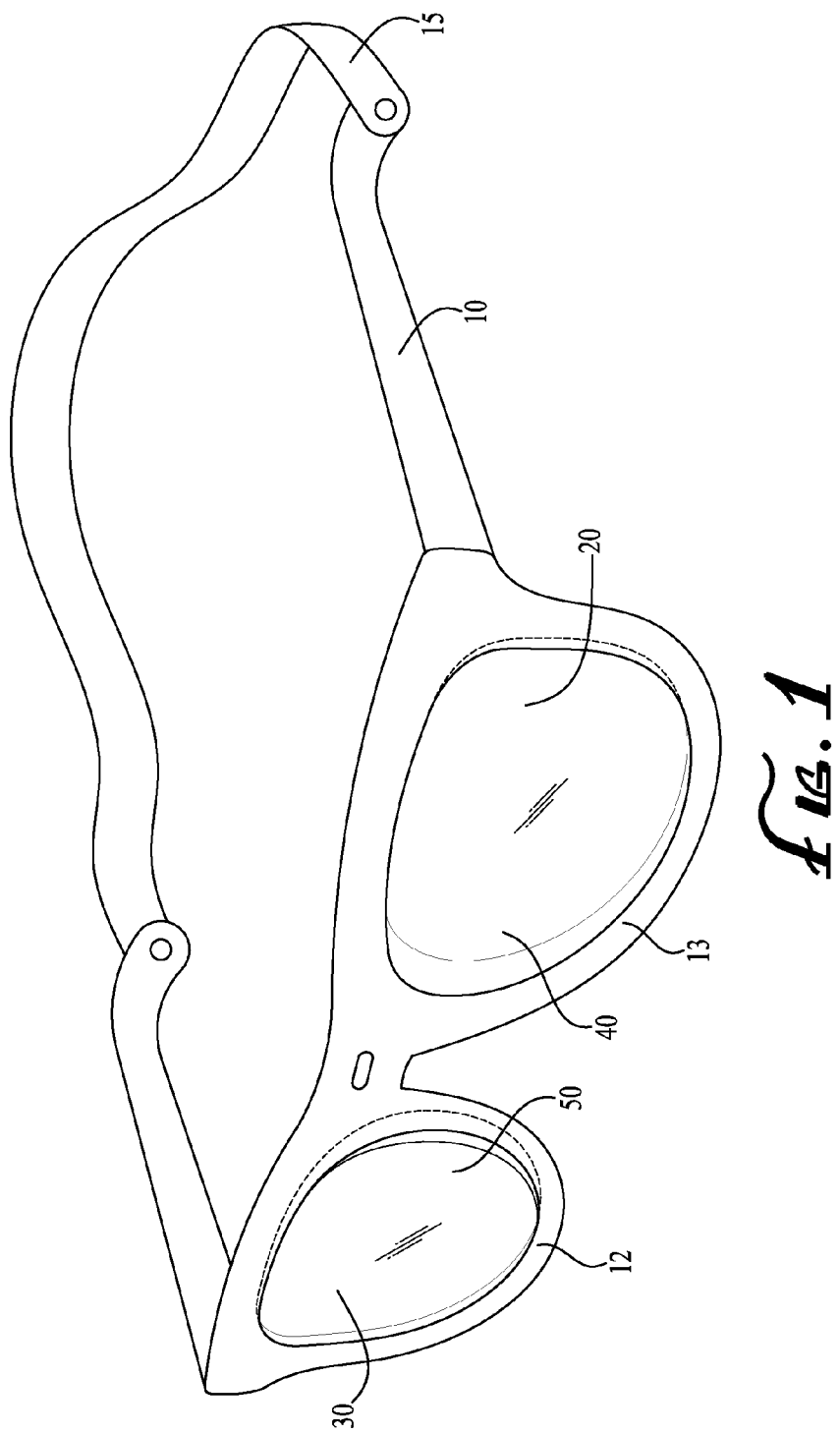
FIG. 1 is a perspective view of a glasses frame and lens system utilized in the present invention.
Figure 2:
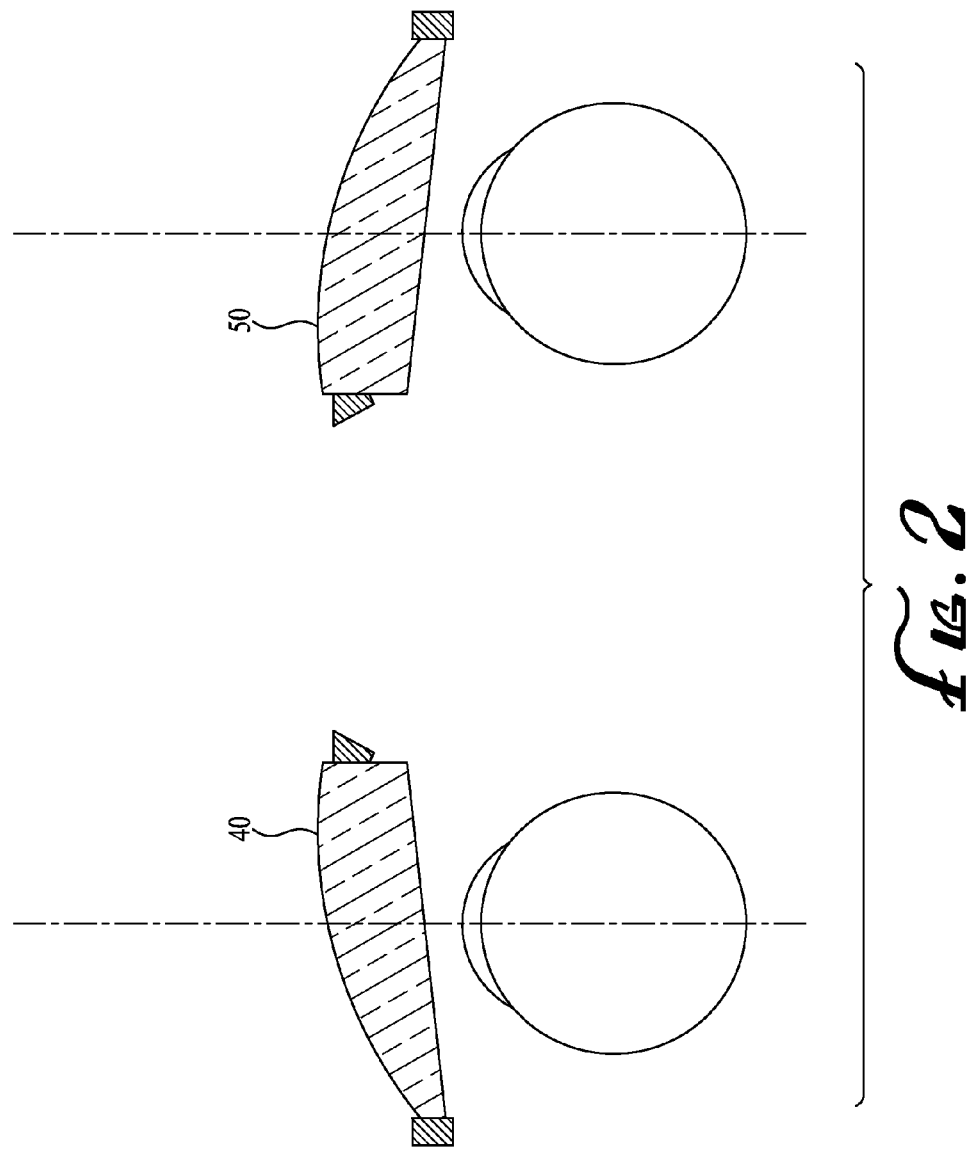
FIG. 2 is a cross section taken along the lenses of FIG. 1.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

The present invention is an improved method of using prisms to treat individuals with visual perceptual disorders, increasing the ability to maintain direct and sustained gaze while also improving visual processing. This innovative method may help avoid or diminish the lifelong disability from autism caused by visual convergence insufficiency. The method provides an innovative use of glasses with prisms in the lenses to correct visual convergence issues, combined with the ability to wear the glasses overnight, enabling an individual to awaken to a visual perception of near normalcy. The daily awakening to a near normal visual spatial field will support the neuro-plasticity to help heal the brain to improve functional life outcomes.

The use of prisms in visual therapy to treat traumatic or acquired brain injury is already known. A prism is essentially a wedge or similar shape of refractive material that shifts the primary or chief rays of light that traverse the prism towards the base of the prism. The greater the power of the prism, the more the chief rays of light are shifted. A person viewing an object through a prism will perceive a shift in the location of that object toward the apex of the prism. This mismatch between the visual input and other cognitive data can cause the brain to work to resolve the conflict, and thereby begin a measure of healing the damage caused by the injury.

The use of prisms for children exhibiting autistic averted gaze or similar visual ocular motor disorders may have a similar effect. By using a prism in one or both lenses of a pair of glasses, objects may be visually relocated into the area of the child's averted gaze, thereby capturing the child's attention and assisting with interaction. For example, an infant that has trouble focusing on the face of another individual may find the person's face positioned within the averted gaze, and begin learning to communicate with or otherwise interact with the person. Many children exhibiting the averted gaze associated with ASD or other visual disorders may see multiple images, excessive spatial movement, or otherwise have trouble focusing on single points, and the use of prisms as described herein may help reduce or eliminate this visual confusion.

In practice, finding the optimal prescription for an autistic child can be difficult, since the child may not be able to provide the feedback necessary to identify the best lenses to use. However, the present invention provides a method for fitting the patient for a lens system that may be useful for a large number of patients, and then altering the prescription as may be desirable based upon feedback or other clues exhibited by the child.

Having the ability to fit a young child with glasses that address averted gaze issues can be critical in children with ASD and similar disorders. The earlier a child is able to address visual connectivity and bonding issues, the earlier the child can begin to participate in the known behavioral, communication, occupational, and physical therapy methods along with social play interventions.

Turning now to FIG. 1, a lens system useful in the present invention is shown. Glasses frame 10 contains lens frames 12, 13 that hold lenses 20, 30. In the figure, left eye lens 20 includes prism 40. Prism 40 may preferably be constructed to encompass the entire lens 20. The invention may also preferably include a second prism 50 within lens 30. Glasses frame 10 may preferably be comprised of a relatively soft and flexible material that may be safely worn 24/7 by a young child, and further may preferably include strap 15 comprised of an elastic material to secure frame 10 to the child's head. Soft frame 10 with outside mounting of prisms 40, 50 allows the system to be worn safely 24 hours per day and 7 days a week, particularly including safe use by the patient for sleeping so that the glasses are utilized immediately upon waking. Such soft frames are available, for example, from Mira Flex, 1421 Courtyard Drive, San Jose Calif. 95118, 866-647-2359 (Sport Look), or from Solo Bambini, 1156 Howard Ave Suite A, Burlingame Calif. 94010, 650-340-1773 (Eagle Scout). The prevention of visual perceptual and motor confusion begins when the eyes open each morning. That moment of visually awakening will preferably happen while viewing through the lenses of the device in order to create a stable sensory perception.

For the individual with two eyes of normal acuity, but with vision confusion, the purpose of prism 40 and optional prism 50 is to sustain visual gaze increasing visual attention and motor performance while viewing through prisms 40, 50. The lens system is intended to be used in the present invention as an aid for individuals who have lost the ability to sustain a stable binocular vision. By appropriately placing prisms 40, 50 directly in the line of sight when viewing straight ahead with a relaxed gaze, the visual field of view may be stabilized, reducing or eliminating the spatial and perceptual confusion. It also may decrease or eliminate the averted gaze characteristic of autism and other cases with convergence insufficiency.

The prism may be of any standard material, shape, and power. Powers ranging from about 0.12 to about 45 diopters may be utilized, although typically the prism will range in power from about 3.0 to about 9.0 diopters. If two prisms are used, they may be of the same power or different powers based upon which works best for the individual being treated. The prisms may also be combined with a prescription corrected for refraction for distance or near vision. The glasses are designed for wearing 24/7. The technology, frame and lenses, can be used in a swimming pool and is useful for aquatic therapy reaching levels of movement and attention not previously achievable.

The fabrication of prisms 40, 50 within or on a carrier lens is possible using various known methods or combination of methods, including grinding specific prism powers. For some applications, two or more separate prisms may be used in order to obtain the correct powers for providing the prism needed for various viewing distances as well as refractive correction for those different differences. Sometimes only one prism of, for example, 9.0 prism diopters is created. Some prisms of lesser powers may be fabricated by grinding the prism into the final prescription incorporating both prism and refractive requirements. Fabrication in the optical industry includes the steps of laying out, surfacing, polishing, edging and finishing. Most often the prism is ground to the full dimension of the lens frame. In very high prism amounts it can also include the steps of drilling the carrier lens mounting a prism within the carrier lens using an adhesive. These various methods of fabrication are all well known in the art.

A thinner design is created by physical composition to create a thin uniform prism 40, 50 without flattened areas, allowing for full viewing area, and is ground to the full dimension of the lens frame 12, 13. Prisms 40, 50 may preferably be large enough to allow for a more normal visual field while viewing through the lens and not around the prism. Although multiple prisms may be placed in a single lens 20 or 30 if necessary for different visual requirements, such a design will be less frequently prescribed. The thinner design of the prisms is preferred, as the patient will preferably be wearing the glasses 24/7, and the thinner design reduces the presence of protruding prism edges that that could be uncomfortable.

Use of the present system may begin with a standard starting prescription. It has been found that a prescription utilizing two prisms 40, 50 positioned base inward, toward the nose, and having a power of at least about 3.0 diopters may be a good starting point. A child may be fitted with a pair of glasses utilizing the starting prescription and his reactions then observed over a short time to note any improvement in averted gaze. Typically, improvement may be recognized within hours, if not the very moment that use begins. Although the patient may be too young to directly communicate the improved visual perception, having parents or another adult familiar with the child present will assist with determining whether the treatment is effective. A child is often immediately seen to focus on objects and improve their overall demeanor, and able to interact with others as never seen before.

If no improvement is seen initially, then one may adjust the prescription by increasing the power of prism 40 and/or prism 50. Through a little trial and error, the prescription may be further adjusted until improvement in averted gaze is noted. Preferably, there may be phases to the method and the use of the system, whereby one power of prism is used initially, and then successive lenses are provided with different prism powers as the visual perceptive ability of the patient changes.

In alternative designs, prism 40 may be in front of the line of sight of the left eye, i.e., within lens frame 13. Such an arrangement is desirable when the individual has one better fixating eye, such as an individual with strabismus or amblyopia. In this case, prism 40 should be placed in the lens or 30 in front of the better functioning and fixating eye and the prism 40 will be placed in the direct line of vision with the base inward towards the nose when convergence insufficiency is present.

In alternative designs, while prism 40 is placed within lens 20 of glasses frame 10, prism 50 may be placed within lens 30, so that a prism is placed in front of the line of sight of both of the patient's eyes. Such an arrangement is desirable when the individual has no preference of fixating or functional preferred eye. There is a possibility of unequal powers of prisms 40 and 50 for an individual with strabismus or amblyopia. Prisms 40 and 50 may preferably be placed in the direct line of vision of the patient when using a relaxed gaze, with the bases of prisms 40, 50 positioned toward the patient's nose. Infrequently, in ASD, a patient may have esotropia, and the prism may be oriented base outward for distance viewing, and in the presence of convergence insufficiency possibly base inward for near vision.

An individual with visual confusion averting gaze could receive a prescription such as a prism power of 9 Base In (meaning base directed toward the nose), usually before both eyes. The individual might also read better with a 10 or 12 Base In prism. Some individuals will read better with lesser prism. At some point the prism stops superimposition and confusing images. Finding the best prism power can be determined with known tests or simply with the text of interest to an individual. Finding a best prism power is seen by watching visual concentration during speaking showing uncharacteristic visual concentration and integration without averted gaze. The perceived stabilization of visual space is helpful functionally, for posturing, breathing, speech and communication, movement and reading.

The most common prism powers of about 9.0 diopters may be used can be utilized in the final prescription. Usually, the power is within the range of about 3.0 to about 9.0 diopters, but in some cases more or less power may be used to facilitate reading and movement, so that the range of power may be between 0.12 and 45 diopters. As mentioned above, the prisms for both eyes are usually oriented base inward, toward the patient's nose, but one or both prisms may be more effective for a patient when oriented base outward.

The final lens prescription for an individual may typically be prepared by an optometrist or ophthalmologist. For individuals with autism who are not yet of presbyopia age who require corrective lenses for reading or near vision, reading powers, such as in the range of +0.37 to +3.0, can be included in the method and device by incorporating the correction into the prism, for example, by fabricating the prism to include the correction. This may be done by grinding the prism, or by mounting the prism on the corrective lens for near vision. A prescription could be non-power PLANO with only a prism. A demonstration temporary prescription might also be the following: O.U. PLANO 9 Base In Both Eyes (9 BIOU).

The initial detection stage for the present invention may preferably be conducted outside of a medical office, such as in the child's home environment, and over a period of days or weeks rather than a regular office visit with an optometrist or ophthalmologist. This is because convergence insufficiency and similar visual disorders are often hard to detect with a simple examination, and may be better determined by having the child utilize corrective lenses while participating in normal daily activities. In order to provide this initial detection, the present invention contemplates a discovery tool comprising multiple pairs of glasses having lenses with varying prism powers that may be used in the home. A parent, guardian, or any adult familiar with the child's normal movements may have the child wear a first pair of glasses having prisms of one power, and observe the child for any changes in behavior and/or interaction with people and objects. It has been found that many children will exhibit immediate and obvious changes. Once the first glasses have been worn for a day or so, the adult may try some of the other glasses to observe whether different prism powers provide different results with the child. As an alternative to providing multiple pairs of glasses, the method may be conducted using a glasses frame that allows for easily interchangeable lenses, and then lenses containing varying prism powers may be provided to the parents. Once the various prism powers have been sufficiently tested, a trained professional may be consulted to determine an initial prescription(s) for the child. An example of this method is set forth below:

EXAMPLE 1

A kit is provided to parents containing three pairs of glasses. Each pair of glasses has a matching prism in both lenses. The power of the prisms in the first pair of glasses are 3.0 Base In, and the other two pairs of glasses have prisms of 6.0 and 9.0 Base In, respectively. The frames of the glasses are color-coded so that the parents may easily determine which glasses correspond to which prism power. Based upon initial conversations with a professional, it is determined the parents should start the testing process by using the pair of glasses having prisms of 3.0 diopters. After fitting the child with the first pair of glasses, the child's initial reactions are recorded and his activities observed for a day or two to check for any improvement in cognitive ability. The parents then switch the child to the glasses having prisms of 6.0 diopters. The child's behavior with the different power prisms is observed to determine if the stronger prisms are better or worse for the child, or whether the stronger prism works better for some activities but not others. The parents then switch the child to the glasses having prisms of 9.0 diopters and continue the observations. Once all of the glasses have been used, the observations are reported to a professional and an initial prescription is obtained. It may be determined the child needs different prescriptions for different types of activities, or that further experimentation is desired using prescriptions of different prism powers or orientations for each eye, but the discovery tool provides rapid feedback as to whether the prism therapy is useful for the child, and provides a starting point for the prescriptions.

While the invention has been described in detail with particular reference to the preferred embodiments thereof, it will be understood that variations and modifications can be effected within the spirit and scope of the invention as previously described and as defined by the claims.

What is claimed is:

1. A method for treating averted gaze disorder in a patient diagnosed with pervasive developmental delays including autism spectrum disorder, the method comprising:
   diagnosing the patient with averted gaze disorder;
   fitting the patient with a first pair of glasses having a first prism within a first lens, the glasses fitted such that the first prism is within the direct line of sight of the patient when viewing with a straight ahead gaze;
   determining whether the use of the first pair of glasses improves the visual cognitive ability of the patient; and
   adjusting the power of the first prism to provide a more effective prescription to treat the visual convergence issues of the patient.

2. The method of claim 1 wherein the power of the first prism is within the range of about 3.0 to about 9.0 diopters.

3. The method of claim 1 wherein the first prism is oriented base inward toward the nose of the patient.

4. The method of claim 1 further comprising the steps of:
   providing a second pair of glasses with a second prism of within a first lens of the second pair of glasses, said first lens of said second pair of glasses being for the same eye as the first lens of said first pair of glasses, wherein the second pair of glasses is fitted such that the second prism is within the direct line of sight of the patient when viewing with a straight ahead gaze, and wherein the power of the second prism is different from the power of the first prism; and
   having the patient wear the second pair of glasses after wearing the first pair of glasses.

5. The method of claim 4 wherein the patient changes from the first pair of glasses to the second pair of glasses when the patient's eyes converge such that the first pair of glasses does not treat the patient's convergence insufficiency as effectively as the second pair of glasses.

6. The method of claim 1 wherein the power of the first prism is within the range of about 0.12 to 45 diopters.

7. A method for treating averted gaze disorder in patients diagnosed with pervasive developmental delays including autism spectrum disorder, the method comprising:
- diagnosing the patient with averted gaze disorder;
- fitting the patient with a first pair of glasses having at least one prism within each lens, the first pair of glasses being fitted such that the prisms are within the direct line of sight of the patient when viewing with a relaxed, straight ahead gaze;
- determining whether the use of the first pair of glasses improves the visual cognitive ability of the patient; and
- providing prisms of different powers from the original prisms as necessary to provide a more effective prescription to treat the visual convergence issues of the patient.

8. The method of claim 7 wherein the power of the prisms in the fitting step of the method are within the range of about 3.0 to about 9.0 diopters.

9. The method of claim 7 wherein at least one of the prisms is oriented with the base inward towards the patients nose.

10. The method of claim 7 wherein the power of the prisms in the fitting step are within the range of 0.12 to 45 diopters.

* * * * *